April 2, 1929.  J. F. O'CONNOR  1,707,490

SHOCK ABSORBER FOR AUTOMOBILES

Filed Nov. 12, 1926

Witness
Wm. Geiger

Inventor
John F. O'Connor
By George J. Haight
His Atty.

Patented Apr. 2, 1929.

1,707,490

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

SHOCK ABSORBER FOR AUTOMOBILES.

Application filed November 12, 1926. Serial No. 147,904.

This invention relates to shock absorbers for automobiles.

An object of the invention is to provide a shock absorbing mechanism adapted to be used in connection with motor vehicles, and more particularly vehicles of the heavy bus type, and wherein said mechanism is connected to an axle of the vehicle and to the fixed body portion thereof, and so arranged as to develop resistance to the movement of the usual vehicle springs and aid the same in absorbing shocks transmitted thereto.

A more particular object of the invention is to provide a lever mechanism, including a lever fulcrumed intermediate its ends on the body portion of the vehicle, said lever means having one end connected to the axle of the vehicle, and the opposite end of said lever having means associated therewith adapted to co-act with mechanism upon the body portion of the vehicle which provides combined frictional and resilient resistance to the movement of said lever, the arrangement being compact and well adapted for application to a vehicle having limited space between the axle and the adjacent portions of the body thereof.

Other and further objects of the invention will more clearly appear from the description and claims hereinafter following.

Figures 1, 2:
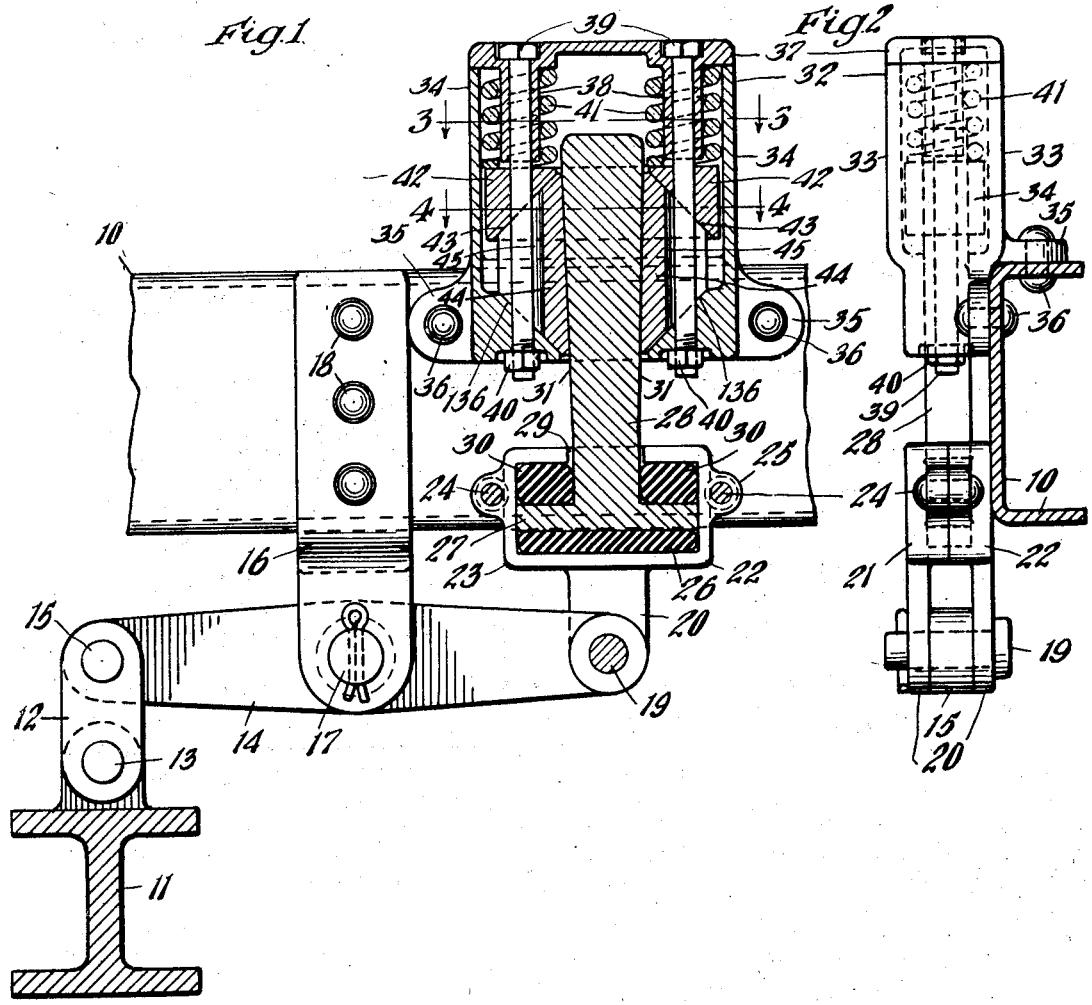
Figure 3:
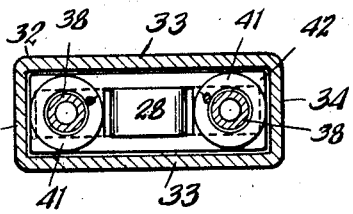
Figure 4:
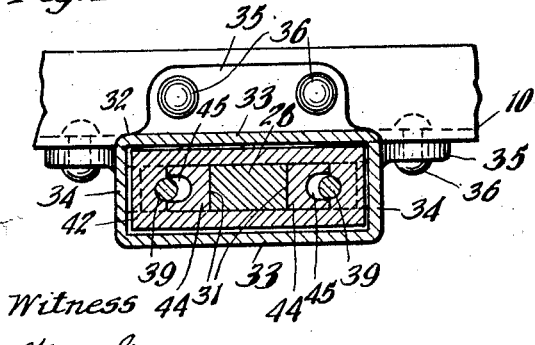

Referring to the drawings forming a part of this specification, Figure 1 is a partial vertical sectional view of the invention, showing portions of the same, and portions of the vehicle frame in side elevation, the axle of said vehicle also being shown in section. Figure 2 is an end elevational view of the shock absorbing mechanism, showing the same in position upon the vehicle frame, which is shown in section. Figure 3 is a horizontal sectional view of the invention substantially on the line 3—3 of Figure 1. And Figure 4 is a horizontal sectional view of the invention substantially on the line 4—4 of Figure 1.

As shown in the drawings, 10 represents a fragment of a side frame of a vehicle, and 11 represents an axle associated with the frame 10, and carried by the usual leaf springs (not shown) which connect the axle to the frame 10.

Affixed to the axle 11 are links 12—12, the lower ends of said links being pivotally connected to said axle in any suitable manner as indicated at 13, while the upper end of link 12 is pivotally connected to a lever 14, as indicated at 15, said lever being fulcrumed intermediate its ends upon a bracket 16, as indicated at 17, the bracket being riveted to the channel-shaped frame member 10 by rivets 19. The free end of the lever 14 is pivotally connected to depending ears 20—20, one of said ears being formed integrally with one cup-shaped section 21 and the other ear 20 being formed integrally with another cup-shaped section 22, the sections 21 and 22 together providing a hollow casing 23, the sections 21—22 being rigidly secured together by means of rivets indicated at 24, which extend through ears 25—25 formed on the opposite ends of each of the sections 21 and 22. Disposed in the casing 23 adjacent the bottom wall thereof, is a pad of rubber 26, said pad having its edges rounded off to permit flow of the rubber in the casing. The pad of rubber 26 has resting thereon a T-shaped head 27 forming part of a plunger 28 which extends outwardly through an aperture 29 in the top wall of the casing 23, and interposed between the top wall of the casing and the T head of the plunger 28 are pads of rubber 30—30, said pads having their corners rounded off to permit flow of the rubber in the casing, when the device is operated.

The plunger 28 is of substantially rectangular formation in cross section, and the opposite sides of said plunger diverge upwardly to provide a wedge-shape construction having upwardly diverging friction surfaces 31—31 at opposite sides thereof. The plunger 28 projects upwardly into a housing 32 which carries mechanism for developing frictional resistance to the movement of the plunger 28. The housing 32 is provided with side walls 33—33, and end walls 34—34. The housing 32 is provided with ears 35—35 through which extend rivets indicated at 36, which secure the housing to the frame member 10 of the vehicle.

Formed integrally with the housing 32 at the bottom thereof, are oppositely disposed, spaced, upwardly diverging wedge surfaces 136—136, said wedge surfaces being so spaced that the plunger 28 projects between the same into the housing 32. Forming part of the housing 32 is a cap 37, said cap being arranged to fit upon the top edges of the walls 33—33 and 34—34, said cap being provided with integral stop sleeves 38—38, retaining bolts 39—39 being provided, having their heads countersunk in the cap 37 and extending through the sleeves 38—38, and through suitable openings in the wedge portions 136—136, said retaining bolts being held in position by nuts 40—40 at their lower ends. Surrounding each of the sleeves 38—38 is a coiled spring 41, the lower end of each of which bears upon the upper surface of a wedge member 42. The wedge member 42 is of rectangular formation and is provided with oppositely disposed downwardly diverging, spaced, wedge surfaces 43—43, said wedge surfaces being spaced apart to such extent as to permit passage of the plunger 28.

Interposed between the oppositely arranged wedge surfaces 43—43 of the wedge member 42, and the wedge surfaces 136—136 at the lower end of the housing, are friction shoes 44—44, one of said shoes being disposed at each side of the plunger 28. Each of the shoes 44 is provided with oppositely extending wedge surfaces adapted to co-operate with the adjacent wedge surface 43 of the wedge member and the wedge surface 36 of the housing, at one side of the plunger, said shoe being also provided with an inclined wedge surface which bears upon the adjacent friction surface 31 of the plunger 38. The shoe at the opposite side of the plunger 28 is exactly similar to the shoe just above described, and has friction surfaces adapted for co-operation with the wedge surfaces 43, 136 and 31, at the opposite side of the plunger 28. Each of the friction shoes 44 is also provided with a cut-out portion indicated at 45 to permit the required lateral movement of the friction shoes 44—44 with reference to the retaining bolts 39—39.

In operation, assuming that the vehicle encounters an obstruction of such character as to bring about upward movement of the axle 11, this movement is transmitted to the lever 14 through the links 12, bringing about downward movement of the opposite end of the lever 14, which movement is communicated to the casing 23, and through said casing with the plunger 28 bringing about downward movement of said plunger. During this action the T-head 27 of the plunger 28 bears upon the rubber pads 30—30 which in turn bear against the top wall of the casing 23. Downward movement of the plunger 28 due to its upwardly diverging formation causes lateral movement in opposite directions of the friction shoes 44—44, and causes slight upward movement of said friction shoes along the wedge surfaces 136—136, and also raises the wedge member 42 through the action of the friction shoes 44—44 upon the wedge surfaces 43—43 of said wedge member, upward movement of said wedge member being resisted by the springs 41—41, thereby setting up a combined frictional and resilient resistance to the downward movement of the plunger 28 which retards upward movement of the axle 11 through the lever 14 and its associated connections.

When the axle 11 moves downwardly, said movement through the lever 14, results in upward movement of the plunger 28 with respect to the housing 32, thereby permitting approach of the friction shoes 44—44 due to the relative smaller size of the lower portions of the plunger, said shoes being held lightly against the plunger under the influence of the springs 41—41 which bear upon the wedge member 42, which in turn bears upon the friction shoes. It will be noticed that this last described resistance is much less than when the plunger is pulled outward against the taper, developing differential action on wedge faces.

While I have herein shown and described what I consider the preferred manner of carrying out the invention, the same is merely illustrative, and I contemplate all changes and modifications which come within the scope of the claims appended hereto.

I claim:

1. In a device of the character described, the combination with a frame member and axle member of a vehicle, said members being movable relatively to each other; of means rigidly affixed to one of said members and carrying spaced friction elements yieldably urged to operative position; of a wedging member co-operating with said friction elements for displacing the same, said element converging toward the other of said members; and means for moving said element toward said other member upon relative approach of said frame member and said axle member.

2. In a device of the character described, the combination with a frame member and axle member relatively movable with reference to each other; of a lever fulcrumed intermediate its ends upon one of said members, one end of said lever being movably connected to the other of said members; a wedging element carried by the opposite end of said lever; and means carried by said first member and cooperating with said wedging element for developing frictional resistance to movement thereof upon approach of said frame member and said axle member.

3. In a device of the character described, the combination with relatively movable members; of a plunger; means secured to one of said members for developing resistance to movement of said plunger; an actuating part operable by relative movement between said members; and means connecting said actuating part and said wedging element, said means including a headed member and cushioning elements, said cushioning elements closely embracing said headed member on opposite sides thereof.

4. In a device of the character described, the combination with a frame member and axle member; a lever fulcrumed intermediate its ends upon said frame member, one of said levers being movably connected to said axle; a plunger having a T-head; a casing surrounding said T-head and movably connected with the opposite end of said lever; resilient cushions interposed between the opposite sides of said T-head and the adjacent walls of the casing surrounding the same; and means carried by said frame member for developing resistance to the movement of said plunger.

5. In a shock absorbing mechanism for automobiles, the combination with a frame member and an axle member; of a housing carried by one of said members, said housing being provided with laterally movable friction shoes, and wedge surfaces co-acting with said shoes for developing yieldable frictional resistance thereon; a tapered wedge member co-acting with said friction shoes for operating the same, said wedge element tapering downwardly; and means for effecting downward movement of said wedge element upon relative approach of said frame and said axle members.

6. In a device of the character described, the combination with a housing having spaced oppositely disposed integrally formed friction wedge surfaces; spaced shoes having friction surfaces adapted to co-act with the friction surfaces of said wedge members; a wedge member movably mounted in said housing, said wedge member and said shoes having co-acting friction surfaces; means yieldably urging said wedge member toward said friction shoes and said integral wedge surfaces; a wedging element interposed between said shoes and having friction surfaces co-operating therewith, said friction surfaces converging in a direction from said wedge member toward said integral wedge surfaces; a frame member upon which said housing is mounted; an axle member relatively movable with reference to said frame member; and means for effecting outward movement of said wedge element with reference to said housing upon relative approach of said frame member and axle member.

7. In a device of the character described, the combination with a housing having integrally formed spaced oppositely disposed wedge surfaces at one end; an integral wedge member having wedge surfaces oppositely arranged with reference to said integral wedge surfaces; a wedge element; friction shoes disposed at opposite sides of said wedge element and having friction surfaces co-acting with the integral wedge surfaces and the wedge surfaces of said wedge member; a detachable cover for said housing; resilient means interposed between said cover and said wedge member; and retainer bolts extending through said resilient means, through said wedge member and said integral wedge surfaces for maintaining the parts in assembled relation.

8. In a device of the character described, the combination with a housing having integrally formed spaced oppositely disposed wedge surfaces at one end; an integral wedge member having wedge surfaces oppositely arranged with reference to said integral wedge surfaces; a wedge element; friction shoes disposed at opposite sides of said wedge element and having friction surfaces co-acting with the integral wedge surfaces and the wedge surfaces of said wedge member; a detachable cover for said housing; resilient means interposed between said cover and said wedge member; and retainer bolts extending through said resilient means, through said wedge member and said integral wedge surfaces for maintaining the parts in assembled relation; a frame member upon which said housing is mounted; an axle member movable relatively with respect to said frame member; and means connecting said wedging element and said axle member.

9. In a shock absorbing device, the combination of relatively movable members, one of said members having opposed wedge faces formed thereon, and the other member having a friction post movable therewith; of friction shoes embracing the post and having wedging engagement with the fixed wedging faces, said post and shoes having interengaging sets of friction surfaces, said surfaces converging outwardly of the mechanism; a movable wedge block having a pair of wedge faces engaging the inner ends of the friction shoes; and means yieldingly resisting movement of the wedge block inwardly of the mechanism.

10. In a shock absorbing mechanism for automobiles, the combination with a body member and a spring member; of friction elements carried by one of said members and provided with independent sets of friction faces; means normally urging said friction elements toward each other, said means including friction faces engageable with one set of faces of said elements; and actuating means carried by the other of said members and movable between said friction elements and in frictional contact with the other set of friction faces thereof.

11. In a shock absorbing mechanism for automobiles, the combination with a body member and a spring member; of a tapered actuating element carried by one of said members; friction elements carried by the other of said members and disposed upon opposite sides of said actuating element, said friction elements being movable toward and away from each other dependent upon movement of said actuating element, and adapted to develop frictional resistance upon the latter, said friction elements being provided with friction surfaces spaced from said actuating element; wedge members having friction surfaces adapted to contact with the friction surfaces of said elements, said wedge members being movable at an angle to the movement of said friction elements; and yieldable means bearing upon said wedge members to urge the same toward said friction elements.

12. In a shock absorbing mechanism, the combination with relatively movable members; of an actuating element connected to one of said members; friction elements carried by the other of said members and disposed upon opposite sides of said actuating element, said friction elements being movable laterally with respect to said actuating element upon relative movement therebetween, each of said friction elements being provided with oppositely disposed friction surfaces; spaced wedge members, each of which is provided with oppositely disposed wedge surfaces adapted to contact an adjacent wedge surface of each of said friction elements; and means bearing upon said wedge members to urge the same toward said friction elements.

13. In a shock absorber for vehicles having the usual body frame member and cooperating supporting spring member, the combination with means mounted on one of said members, including friction shoes, wedge blocks engaging the shoes and spring means for forcing the blocks into wedging engagement with the shoes to press the same laterally inwardly toward each other; of a friction post movable with the other member, said post having a tapered section disposed between the friction shoes and having frictional contact therewith, said post being tapered in a direction to force the shoes apart when the vehicle spring member and body member approach each other to provide high resistance and allow approach of said shoes when said members are moved apart to provide lower frictional resistance.

In witness that I claim the foregoing I have hereunto subscribed my name this 8th day of November, 1926.

JOHN F. O'CONNOR.